(12) United States Patent
Chari et al.

(10) Patent No.: US 12,509,682 B2
(45) Date of Patent: Dec. 30, 2025

(54) FATTY ACID SYNTHASE, INHIBITORS AND MODIFICATIONS THEREOF AND ITS USE

(71) Applicant: MAX-PLANCK-GESELLSCHAFT ZUR FÖRDERUND DER WISSENSCHAFTEN E.V., Munich (DE)

(72) Inventors: Ashwin Chari, Göttingen (DE); Holger Stark, Waake (DE); Kashish Singh, Göttingen (DE); Benjamin Moritz Graf, Göttingen (DE)

(73) Assignee: MAX-PLANCK-GESELLSCHAFT ZUR FÖRDERUND DER WISSENSCHAFTEN E.V., Munich (DE)

( * ) Notice: Subject to any disclaimer, the term of this patent is extended or adjusted under 35 U.S.C. 154(b) by 933 days.

(21) Appl. No.: 17/440,425

(22) PCT Filed: Mar. 20, 2020

(86) PCT No.: PCT/EP2020/057741
§ 371 (c)(1),
(2) Date: Sep. 17, 2021

(87) PCT Pub. No.: WO2020/188074
PCT Pub. Date: Sep. 24, 2020

(65) Prior Publication Data
US 2022/0154181 A1  May 19, 2022

(30) Foreign Application Priority Data

Mar. 20, 2019 (EP) .................................. 19163958

(51) Int. Cl.
C12N 15/113 (2010.01)
C12N 9/10 (2006.01)
C12P 7/6409 (2022.01)

(52) U.S. Cl.
CPC .......... *C12N 15/113* (2013.01); *C12N 9/1029* (2013.01); *C12P 7/6409* (2013.01); *C12Y 203/01086* (2013.01)

(58) Field of Classification Search
None
See application file for complete search history.

(56) References Cited

FOREIGN PATENT DOCUMENTS

| WO | 2015/048339 A2 | 4/2015 |
| WO | 2017/211775 A1 | 12/2017 |

OTHER PUBLICATIONS

Chica et al. Curr Opin Biotechnol. Aug. 2005;16(4):378-84. (Year: 2005).*
Singh et al. Curr Protein Pept Sci. 2017, 18, 1-11 (Year: 2017).*
Bornscheuer et al. Curr Protoc Protein Sci. Nov. 2011;Chapter 26:Unit26.7. (Year: 2011).*
Yoshikuni et al. Curr Opin Chem Biol. Apr. 2007;11(2):233-9. (Year: 2007).*
Accession A0A0L8VSI6. Nov. 11, 2015 (Year: 2015).*
Accession G2WC52. Nov. 16, 2011 (Year: 2011).*
Gajewski et al: "Engineering fungal de novo fatty acid synthesis for short chain fatty acid production", Nature Communications, vol. 8, pp. 1-8, Mar. 10, 2017.
Hanssum et al: "An Inducible Chaperone Adapts Proteasome Assembly to Stress", Molecular Cell, vol. 55, No. 4, pp. 566-577, Aug. 1, 2014.
Jenni et al: "Structure of Fungal Fatty Acid Synthase and Implications for Iterative Substrate Shuttling", Science, vol. 316, No. 5822, pp. 254-261, Apr. 13, 2007.
Lomakin et al: "The Crystal Structure of Yeast Fatty Acid Synthase, a Cellular Machine with Eight Active Sites Working Together", Cell, vol. 129, No. 2, pp. 319-332, Apr. 1, 2007.
Singh et al: "Discovery of a Regulatory Subunit of the Yeast Fatty Acid Synthase", Cell, vol. 180, p. 1130-1143, Mar. 19, 2020.

* cited by examiner

*Primary Examiner* — Christian L Fronda
(74) *Attorney, Agent, or Firm* — WCF IP (57) ABSTRACT

In a first aspect, the present invention relates to new recombinant polypeptides derived from the newly identified gamma subunit of the fatty acid synthase protein complex. In addition, a fatty acid synthase protein complex comprising these new recombinant polypeptides are disclosed as well as nucleic acid molecules encoding these polypeptides. Further, a host cells containing the nucleic acid molecule encoding the polypeptides according to the present invention or expressing the polypeptide according to the present invention are described. In addition, an isolated fatty acid synthase protein complex is disclosed containing the newly identified gamma subunit thereof. Moreover, methods for determining the suitability of candidate compounds capable of inhibiting either the ketoreductase, enoylreductase or malonyl/palmitoyl transferase present in the FAS protein complex and methods for designing inhibitors of said enzymes are disclosed. Finally, the present invention relates to the inhibitors and their use in medicinal applications.

10 Claims, 5 Drawing Sheets

Specification includes a Sequence Listing.

FATTY ACID SYNTHASE, INHIBITORS AND MODIFICATIONS THEREOF AND ITS USE

In an aspect, the present invention relates to new recombinant polypeptides derived from the newly identified gamma subunit of the fatty acid synthase protein complex. In addition, a fatty acid synthase protein complex comprising these new recombinant polypeptides are disclosed as well as nucleic acid molecules encoding these polypeptides. Further, host cells containing the nucleic acid molecule encoding the polypeptides according to the present invention or expressing the polypeptide according to the present invention are described. In addition, an isolated fatty acid synthase protein complex is disclosed containing the newly identified gamma subunit thereof. Moreover, methods for determining the suitability of candidate compounds capable of inhibiting either the ketoreductase, enoylreductase or malonyl/palmitoyl transferase present in the FAS protein complex and methods for designing inhibitors of said enzymes are disclosed. Finally, the present invention relates to the inhibitors and their use in medicinal applications.

PRIOR ART

The fatty acid synthase is a multi-enzyme protein that catalyzes fatty acid synthesis. So far it is described that said enzyme in yeast is an enzymatic system composed of two multifunctional subunits in which substrates are handed from one functional domain to the next, by means of an ACP domain encoded by the alpha subunit. The fatty acid synthase (FAS) catalyzes the synthesis of palmitate from acetyl-CoA and malonyl-CoA in the presence of NADPH.

Two classes of FAS are described. That is, FAS type I system utilise a single or two large, multifunctional polypeptide and are common to both animals and fungi. A type I fatty acid synthase system can also be found in a subgroup of bacteria, namely, the corynebacteria, mycobacteria, and *Nocardia*. In these bacteria, the FAS I system produces palmitic acid and cooperates with the FAS II system described below to produce a greater diversity of lipid products.

The FAS type II is found in archaea and bacteria, and is characterized by the use of discrete, monofunctional enzymes for fatty acid synthesis. Inhibitors of this pathway of FAS II are being investigated as possible antibiotics. The yeast fatty acid synthase as a type I FAS is described as a 2.6 MDa barrel-shaped complex and should be composed of two unique multifunctional subunits, α and β. It is described that said α and β units are arranged in an $\alpha_6 \beta_6$ structure. The catalytic activities of this enzyme complex involve a coordination system of enzymatic reactions between the α- and β-subunits. It is submitted that the enzyme complex consists of six functional centers for fatty acid synthesis. Generally, the FAS is regarded as a suitable target for treating various diseases including cancer since the FAS is upregulated e. g. in breast cancer etc.

Structural studies by multiple labs have firmly established that the type I fungal fatty acid synthase (FAS) is a D3 symmetric 2.6 MDa megaenzyme complex that forms a barrel-shaped particle with a length of 270 Å and a width of 250 Å (e.g. Jenni et al., *Science*. 316, 254-61 (2007)). These earlier structural studies indicate that the *S. cerevisiae* FAS is composed of six copies of the 210 kDa α-subunit, which form the equatorial central wheel ($\alpha_6$), and six copies of the 230 kDa β-subunit, which form the domes of the particle ($\beta_6$) (I. B. Lomakin, Y. Xiong, T. A. Steitz, *Cell*. 129, 319-32 (2007). All enzymatic activities required for the synthesis of saturated C16-C18 fatty acid chains reside within the α- and β-subunits. The α-subunit contains the ketoreductase (KR), ketosynthase (KS) and phosphopantetheinyl transferase (PPT) domains, the β-subunit harbors the acetyltransferase (AT), enoylreductase (ER) and dehydratase (DH) domains. The malonyl/palmitoyl transferase (MPT) domain is mostly formed by the very C-terminal part of the β-subunit, but is completed by the N-terminus of the α-subunit. During fatty acid synthesis, the growing fatty acid chain is thought to be iteratively shuttled by the acyl carrier protein (ACP) domain (residing in the α-subunit) to each of these individual enzyme active sites. In addition to academic interest in the mechanism of fatty acid synthesis, fatty acids have emerged as valuable platform compounds for the biotechnological production of fine chemicals and biofuels from renewable resources. Indeed, type I FAS megaenzymes, including those with the architecture of yeast FAS, have been successfully subjected to protein engineering to generate e.g. short chain fatty acids and polyketides (J. Gajewski, et. al., *Nat. Commun.* 8, 1-8 (2017)). However, to date, mechanistic and structural details concerning the iterative shuttling process remain sparse and the structural determinants thereof remain entirely elusive, but are needed to aid in these biotechnological efforts. Finally, fatty acid biosynthesis is also known to be involved in ailments like cancer and obesity, accordingly the ability to directly impact fatty acid synthesis has substantial translational implications (D. Wang, R. N. Dubois, *J. Natl. Cancer Inst.* 104, 343-5 (2012)).

BRIEF DESCRIPTION OF THE PRESENT INVENTION

In an aspect, the present invention relates to a recombinant polypeptide of amino acids 1 to 132 of SEQ ID No. 1 or a functional fragment thereof, or a homolog thereof. Further, a recombinant polypeptide is provided comprising the amino acids of SEQ ID No. 1 containing further an insert of at least 20 amino acids, like 25 amino acids or a functional fragment thereof, or a homolog thereof.

Moreover, a polypeptide is provided consisting of
  i.) at least 6 consecutive amino acids of Seq ID No. 2, like at least 8 consecutive amino acids, e.g. at least 10 consecutive amino acids or a functional fragment thereof, or a homolog thereof; or
  ii.) at least 5 consecutive amino acids of Seq ID No. 3, like at least 6 consecutive amino acids, e.g. at least 8 consecutive amino acids or a functional fragment thereof, or a homolog thereof; or
  iii.) at least 6 consecutive amino acids of Seq ID No. 4, like at least 8 consecutive amino acids, e.g at least 10, 12 or 14 consecutive amino acids of Seq ID No. 4, or a functional fragment thereof, or a homolog thereof.

Said polypeptides have altering activity on enzymes, like enzyme present in the FAS complex.

Further, a fatty acid synthase protein complex comprising the recombinant polypeptide as described herein is disclosed.

In addition, nucleic acid molecules encoding the polypeptides according to the present invention as well as host cells containing said nucleic acid molecules and/or expressing the polypeptides according to the present invention are described. Further, an isolated fatty acid synthase protein complex containing the described α- and β-subunits as well as the polypeptide of SEQ ID No. 1 is claimed. Said isolated fatty acid synthase protein complex is obtainable by a method comprising the steps of a) providing a crude sample containing the fatty acid synthase protein complex;
b) conducting a first centrifugation step for separation of cell debris at 25.000 to 35.000×g;
c) supplementing the supernatant obtained from the first centrifugation step with an osmolyte in an amount of from 0% to 25% (w/v) and, optionally, compounds allowing thiol-alkylation of cysteines;
d) conducting a second centrifugation step by centrifugation at 50.000 to 150.000×g, like 80.000 to 120.000×g;
e) treating the supernatant obtained from the second centrifugation step with a water-soluble polymer, in particular, a non-ionic polymer or a polymer with zero net charge, like polyalkylene glycol, polyamine, or polycarboxylate for precipitation;
f) conducting a density gradient centrifugation using an osmolyte with the polymer-based precipitate like the polyalkylene glycol-based precipitate, after resuspension thereof in a buffer not containing said polymer, like the polyalkylene glycol;
g) optionally repeating once or multiple times step e) and f)
h) concentration by water-soluble polymer based precipitation, like polyalkylene glycol based precipitation of the fatty acid synthase protein complex;
for obtaining a purified fatty acid synthase protein complex.

Further, methods for determining the suitability of a candidate compound capable of inhibiting a ketoreductase (KR) or an enoylreductase (ER) or a malonyl/palmitoyl transferase (MPT) are disclosed as well as inhibitors of said enzymes, in particular, when being part of the FAS protein complex. Finally, the use of said inhibitors in the prophylaxes or treatment of various disease including cancer, infectious diseases but also tuberculosis or obesity are described.

BRIEF DESCRIPTION OF THE DRAWINGS

FIG. 2 FIG. 2A: SDS-PAGE analysis of FAS purification from a wild-type *S. cerevisiae* strain. Aliquots of S30 (lane 2) and S100 (lane 3) extracts, the resuspended PEG cut (lane 4), the pool of the first, second and third sucrose gradients (lanes 5, 6 and 7) as well as the final purified protein preparation (lane 7) and a molecular weight marker (lane 1) are depicted. Note the distinct co-purification of a protein with an apparent molecular weight of 20 kDa.

FIG. 4: Structural differences elicited in the FAS holoenzyme upon binding of the gamma-subunit. Crosslinking mass spectrometry (XL-MS) allows the interpretation of the additional density visible in FAS holoenzyme (rotated) conformation. The N-terminal region of the γ-subunit is positioned at the ER domain, a central part close to the MPT domain, whereas the C-terminal part appears to contact KR and KS domains.

FIG. 5: Function of the γ-subunit in the FAS holoenzyme. Substrate concentration dependence of FAS for substrate NADPH. The left panel shows the plot of ΔTma17p-FAS initial velocities versus the concentrations of NADPH. The NADPH dependence of ΔTma17p-FAS is not hyperbolic and suggests substrate activation. The kinetic model utilized to describe this behavior is shown as an inset. The right panel shows an overlay of ΔTma17p-FAS (black) and FAS holoenzyme (red) initial velocities versus the NADPH concentration. Note the change to saturation kinetics in the case of the FAS holoenzyme and an increase in the $K_M$app for NADPH (ΔTma17p-FAS: $K_M$app=9.1±1.8 μM, FAS holoenzyme $K_M$app=155±29 μM).

DETAILED DESCRIPTION OF THE PRESENT INVENTION

In an aspect, recombinant polypeptides are provided. In an embodiment of the present invention, a recombinant polypeptide is provided wherein said polypeptide consist of amino acids 1 to 132 of SEQ ID No. 1 or a functional fragment thereof, or a homologue thereof. The recombinant polypeptide may further have additional amino acids whereby the 133 to 150 of SEQ ID No. 1 are absent.

As used herein, the term "functional fragment thereof" refers to polypeptides having the same functionality as the polypeptide or the nucleic acid molecule referred to, respectively. That is, the functional fragment may contain a deletion or substitution of at least one amino acid residue or at least one nucleic acid residue without altering significantly the function of the polypeptide as described herein.

The polypeptides according to the present invention include fragments also known as derivatives wherein single amino acid molecules may be substituted with a different amino acid residue. For example, the amino acid at position 2 may be a serine instead of a cysteine. In addition, the single substitutions include conservative amino acid substitutions. The skilled person is well aware of suitable substitutions without altering significantly the activity of the recombinant polypeptide.

As used herein, the terms "comprising", "comprises" and "comprised of" are synonymous with "including", "includes" or "containing", "contains" and are inclusive or open ended and do not exclude additional, non-recited members, elements and method steps. It will be appreciated that the terms "comprising", "comprise" and "comprised of" as well as "including", "includes" or "containing", "contains" as used herein comprise the terms "consisting of", "consist" and "consist of" as well as "composed of".

All reference cited in the present specification are hereby in corporate by reference in their entity. In particular, the teachings of all references herein specifically refer to are incorporated by reference.

Unless otherwise identified, all terms used in disclosing the invention including technical and scientific terms, have the meaning as one understood by one of the ordinary skilled in the art to which the invention belongs. By means of further guidance, term definitions are included to better appreciate the teaching of the present invention.

As used herein, the similar forms "a", "an" and "the" include both singular and plural references unless the context clearly dictates otherwise.

The term "homolog thereof" refers to recombinant polypeptides as claimed herein being derived from other species, in particular, belonging to other yeast species as the γ-unit described herein of SEQ ID No. 1 obtained from *Saccharomyces cerevisiae*. Homologs thereof include the same molecule from other *saccharomyces* species as well as from other eukaryotic species in particular yeast and bacterial species like candida, aspergillus, yarrowia, penicillium, Rhodosporidium, mycobacteria, chaetomium.

The term "recombinant" refers to polypeptides not being present in nature or which have been not isolated from nature before.

The term "a candidate compound" refers to a molecule being a small molecule, a chemical or biological molecule, in particular, being composed or comprising amino acid residues.

The term "crystal" refers to a supra-molecular assembly of any given single molecule or molecule species in a spatially repetitive manner. Hereby, the molecule or molecular species can be defined as any chemical moiety whether atoms are connected by covalent bonds and/or non-covalent bonds.

As used herein, the term "osmolyte" refers to compounds affecting osmosis. Examples include but are not restricted to glycerol, sucrose, sugars in general, trimethylamine-N-oxide (TMAO) and ethylene glycol.

The term "polymer with zero net charge" refers to a polymer, which is built up by the consecutive covalent attachment of a repeating chemical unit in the size range of hundreds of Daltons. The definition of zero net charge is satisfied by the properties of the repeating unit, which ideally contains no electronic charge (neither positive nor negative). If electronic charges are present, they should appear in a balanced manner, i.e. positive charges with a value of two should be counter-balanced by negative charges with a value of two. Such molecules with counter-balanced electronic charges are referred to as zwitterionic species or chemicals.

The term "non-ionic polymer" refers to a molecule, which is built up by the consecutive covalent attachment of a repeating chemical unit in the size range of hundreds of Daltons. When the chemical unit contains no electronic charge, the resulting polymer is referred to as a non-ionic polymer.

Examples for non-covalent bonds include but are not restricted to hydrogen-bonds, electrostatic interactions and van der Waals forces. The relation of one molecule in a crystal to another can be described by strict symmetry rules which are based on the Bravais lattices.

As used herein, the term "inhibitor" refers to a compound, including a biological or chemical entity capable of reducing a biological activity. In the present context, the inhibitor is a biological or chemical molecule which reduces the ketoreductase activity, enoylreductase activity and/or MPT activity. In particular, an inhibitor is an entity which reduces the "normal" activity of said biological entity at least ten fold, like at least twenty fold, in particular, at least fifty fold.

Unless otherwise indicated, the term FAS protein complex or FAS refers to the FAS I protein complex.

The term "FAS protein complex" refers to a protein complex being composed of at least three moieties, namely, the α-subunit, the β-subunit of the FAS protein complex of FAS I and a third unit, e.g. the candidate compound, a polypeptide as defined herein, including the gamma-subunit of SEQ ID No. 1 or fragments thereof, or homologs thereof.

The polypeptide of SEQ ID No. 1 represents the TMA 17 molecule from *Saccharomyces cerevisiae*. So far, said polypeptide has been described as being induced upon stress and should be associated with proteasome assembly.

The present inventors recognized that the recombinant polypeptide of amino acids 1 to 132 of SEQ ID No. 1 or a functional fragment thereof, or a homolog thereof when being present in the FAS complex demonstrates higher ketoreductase activity compared to the FAS complex containing the full amino acid sequence of SEQ ID No. 1. That is, the present inventors recognized that the amino acids 133 to 150 of SEQ ID No. 1 represents the interacting sequence with the ketoreductase in the FAS protein complex. As demonstrated below, the presence of the full length polypeptide of SEQ ID No. 1 has regulatory roles in the activity of various enzymes present in the FAS protein complex.

In a further embodiment, a recombinant polypeptide is provided containing at least parts of the amino acids of SEQ ID No. 1, comprising aa1 to aa112 of SEQ ID No. 1, and an insert located C-terminally to aa112 of SEQ ID No. 1. Said insert is at least of 25 amino acids in length, optionally, said recombinant polypeptide has C-terminally of said insert at least one of the aa of from aa113 to aa150 of SEQ ID No. 1.

In a further embodiment of the present invention a recombinant polypeptide comprising the amino acids of SEQ ID No. 1 further containing an insert of at least 15, like at least 20, like at least 23, 25, 28, 30 or more amino acids or a functional fragment thereof or a homolog thereof. For example the insert is of form 5 kDa to 25 kDa in size.

That is, a recombinant polypeptide comprising the amino acids of amino acids 1 to amino acids 112 of SEQ ID No. 1 further containing an insert of at least 25 amino acids, or a functional fragment of said recombinant polypeptide, or a homolog thereof is provided.

In an embodiment of the recombinant polypeptide, the polypeptide is a polypeptide containing said insert being composed from the N-terminus to the C-terminus of
   a first unit comprising amino acid 1 to amino acid 112 of SEQ ID No. 1;
   a second unit composed of amino acids 113 to 132 of Seq. ID No. 1 containing an insert inserted after an amino acids of amino acids 112 to 132 of SEQ ID No. 1; and,
   optionally a third unit comprising amino acids 133 to 150 of SEQ ID No. 1; or a functional fragment of said polypeptide, or a homolog thereof.

It has been recognized by the present inventors that the insert after any one of the amino acid 112 of SEQ ID No. 1 and before SEQ ID No. 132 of SEQ ID No. 1 may be particularly beneficial to avoid any negative influence on interacting properties of the remaining amino acids. In an embodiment, the recombinant polypeptide described include a polypeptide wherein in the second unit composed of amino acids 113 to 132 containing said insert, at least one or all of the amino acids 113 to 132 may be absent. In an embodiment the aa of 113 to 132 of SEQ ID No. 1 are absent.

Moreover, a recombinant polypeptide consisting of from the N-terminus to the C-terminus of the aa1 to aa112 of SEQ ID No. 1, an insert of at least 25 amino acids, like at least 50 amino acids, and the aa133 to aa150 of SEQ ID No. 1.

In an embodiment of the present invention, the insert present in the recombinant polypeptide according to the present invention is an enzyme. In particular, the enzyme is selected from a desaturase, thioesterase, oxygenase, hydroxylase, cyclogenase, fatty acid lyase.

The insert present in the polypeptide according to the present invention may have a size of at most 60 kDa, like at most 50 kDa, for example 40 kDa, 35 kDa, 30 kDa, at most 25 kDa, at most 20 kDa. The insert has at least a size as mentioned above, namely of at least 15 amino acids. For example, the size of the insert is at least 2 kDa, like at least 2.5 kDa, like at least 3 kDa.

In an embodiment of the present invention, the polypeptide consist of
  i.) at least 6 consecutive amino acids of Seq ID No. 2, like at least 8 consecutive amino acids, e.g. at least 10 consecutive amino acids or a functional fragment thereof, or a homolog thereof; or
  ii.) at least 5 consecutive amino acids of Seq ID No. 3, like at least 6 consecutive amino acids, e.g. at least 8 consecutive amino acids or a functional fragment thereof, or a homolog thereof; or
  iii.) at least 6 consecutive amino acids of Seq ID No. 4, like at least 8 consecutive amino acids, e.g at least 10, 12 or 14 consecutive amino acids of Seq ID No. 4, or a functional fragment thereof, or a homolog thereof.

The polypeptide mentioned under i.) to iii.) represent peptides which alter enzyme activity, in particular, inhibit enzyme activity. Said enzyme activity are particularly enzyme activity of the FAS complex.

The amino acids of SEQ ID No. 2 represent the interacting interface with the ketoreductase present in the FAS protein complex. The amino acids of SEQ ID No. 2 represents the amino acids present in the gamma-unit interacting with the enoylreductase and the amino acids of SEQ ID No. 4 represents the amino acid of the gamma-unit interacting with the MPT of the FAS protein complex.

Namely, the polypeptide as defined above referring to SEQ ID Nos. 2, 3 and 4 represents interacting and, thus, regulating moieties with the respective enzyme activity present in the other subunits of the FAS protein complex.

As demonstrated by the present inventors, the gamma-subunit also known as TMA 17, has various interacting sites with the other subunits of the FAS protein complex, namely of the α- and β-subunit.

In a further aspect, the present inventions provide a fatty acid synthase protein complex comprising the recombinant polypeptide according to the present invention. Further, the fatty acid synthase protein complex according to the present invention contains α- and β-subunits as described in the art.

As demonstrated below, the present inventors identify surprisingly a further subunit present in the FAS protein complex (FAS I), namely, the Tma17 polypeptide previously known to interact with the proteasome or ribosome only.

In an embodiment of the present invention, the fatty acid synthase protein complex containing the recombinant polypeptide as described herein for use in the production of fatty acid and biofuels, in particular, for use in the biological production of free fatty acids, keto-fatty acids, fatty acids alcohol, cyclic fatty acids and elongated fatty acids. That is, in particular using the recombinant polypeptide as defined in containing the insert it is possible to introduce further enzymatic activities into the described sequence. Said enzymatic activities allow to act on the fatty acids, thus, changing further the product of the FAS protein complex. In case of a polypeptide according to the present invention having in inhibitory activity on at least one of the enzymes present on the FAS protein complex, one of the steps of the fatty acid synthesis conducted therein may be inhibited, thus, changing the product obtained.

The skilled person is well aware of suitable inserts to arrive at modified or altered fatty acid residues.

In a further embodiment, the present invention relates to a nucleic acid molecule encoding a polypeptide according to the present invention. The nucleic acid molecule may be composed of nucleic acids known in the art including DNA, RNA, or other molecules like PNA etc. Furthermore, vectors are provided comprising the nucleic acid sequence according to the present invention encoding the peptide as described. The skilled person is well aware of suitable vector system and vectors, in particular, vectors allowing transfection and transduction of eukaryotic cells including transformation and recombination into the yeast genome.

Moreover, the present inventions relates to a host cell containing the nucleic acid molecule according to the present invention and/or expressing a polypeptide according to the present invention. In an embodiment, the host cell is a microorganism containing a type I fatty acid synthase (FAS I), like yeast.

In a further embodiment, an isolated fatty acid synthase protein complex is described obtainable by a method comprising the steps of:
a) providing a crude sample containing the fatty acid synthase protein complex;
b) conducting a first centrifugation step for separation of cell debris at 25.000 to 35.000×g;
c) supplementing the supernatant obtained from the first centrifugation step with an osmolyte in an amount of from 0% to 25% (w/v) and, optionally, compounds allowing thiol-alkylation and/or reduction of cysteines;
d) conducting a second centrifugation step by centrifugation at 50.000 to 150.000×g, like 80.000 to 120.000×g;
e) treating the supernatant obtained from the second centrifugation step with a water-soluble polymer, in particular, a non-ionic polymer or a polymer with zero net charge, like polyalkylene glycol, polyamine, or polycarboxylate for precipitation;
f) conducting a density gradient centrifugation using an osmolyte with the polymer-based precipitate like the polyalkylene glycol-based precipitate, after resuspension thereof in a buffer not containing said polymer, like the polyalkylene glycol;
g) optionally repeating once or multiple times step e) and f)
h) concentration by water-soluble polymer-based precipitation, like polyalkylene glycol based precipitation of the fatty acid synthase protein complex; for obtaining a purified fatty acid synthase protein complex.

That is, as described in detail in WO 2017/211775 A1 which is included herein fully by reference, the method allows to isolate the FAS protein complex including the newly identified gamma-subunit as described herein.

While the prior art describes the FAS protein complex as a complex composed of two subunits only, the present inventors conducting the method described in WO 2011/211775 A1 obtained a FAS protein complex containing a third subunit. The subunit is the Tma17 polypeptide.

In an embodiment, reduction of cysteines is performed by the use of phoshine based reducing agents, like tricarboxyerthylphosphine (TCEP). Further, the density gradient is performed at room temperature, like at 18° C. to 22° C., Moreover, in an embodiment of the present invention, the salt concentration (NaCl and KCl in combination) during the purification steps is maintained below 150 mM to minimize dissociation of the gamma-unit.

Moreover, the present invention relates to a method for determining the suitability of a candidate compound capable of inhibiting a ketoreductase, in particular, the ketoreductase present in the FAS protein complex, comprising the steps of:

Crystallization of the ketoreductase, in particular, the FAS protein containing the candidate compound in a reservoir solution containing a water-soluble polymer, in particular, a non-ionic polymer or a polymer with zero net charge, like polyalkylene glycol, polyamine, or polycarboxylate, in particular, polyethylene glycol or providing a crystallized ketoreductase, in particular, FAS protein complex containing the candidate compound;

Determining the crystal structure of the ketoreductase, in particular, the FAS protein complex by diffraction analysis with a resolution of 2.8 Å or below;

Determining the suitability of the candidate compound as an inhibitor of the ketoreductase, in particular, the ketoreductase of the FAS protein complex based on said analysis, or, alternatively or in combination, Preparing the ketoreductase, in particular, the FAS protein complex, containing the candidate compound capable of inhibiting a ketoreductase, in particular, the ketoreductase present in the FAS protein complex for cryo-electron microscopy analysis;

Conducting cryo-electron microscopy with said ketoreductase, in particular, the FAS protein complex;

Determining the suitability of the candidate compound as an inhibitor of the ketoreductase, in particular, the ketoreductase of the FAS protein complex.

Further, the present invention relates to a method for determining the suitability of a candidate compound capable of inhibiting an enoylreductase, in particular, the enoylreductase present in the FAS protein complex, comprising the steps of:

Crystallization of the enoylreductase, in particular, the FAS protein containing the candidate compound in a reservoir solution containing a water-soluble polymer, in particular, a non-ionic polymer or a polymer with zero net charge, like polyalkylene glycol, polyamine, or polycarboxylate, in particular, polyethylene glycol or providing a crystallized enoylreductase, in particular, FAS protein complex containing the candidate compound;

Determining the crystal structure of the enoylreductase, in particular, the FAS protein complex by diffraction analysis with a resolution of 2.8 Å or below;

Determining the suitability of the candidate compound as an inhibitor of the enoylreductase, in particular, the enoylreductase of the FAS protein complex based on said analysis, or, alternatively or in combination, Preparing the enoylreductase, in particular, the FAS protein complex, containing the candidate compound capable of inhibiting an enoylreductase, in particular, the enoylreductase present in the FAS protein complex for cryo-electron microscopy analysis;

Conducting cryo-electron microscopy with said enoylreductase, in particular, the FAS protein complex;

Determining the suitability of the candidate compound as an inhibitor of the enoylreductase, in particular, the enoylreductase of the FAS protein complex.

Moreover, the present invention provides a method for the suitability of a candidate compound capable of inhibiting an malonyl/palmitoyl transferase (MPT), in particular, the MPT present in the FAS protein complex, comprising the steps of:

Crystallization of the MPT, in particular, the FAS protein containing the candidate compound in a reservoir solution containing a water-soluble polymer, in particular, a non-ionic polymer or a polymer with zero net charge, like polyalkylene glycol, polyamine, or polycarboxylate, in particular, polyethylene glycol or providing a crystallized MPT, in particular, FAS protein complex containing the candidate compound;

Determining the crystal structure of the MPT, in particular, the FAS protein complex by diffraction analysis with a resolution of 2.8 Å or below;

Determining the suitability of the candidate compound as an inhibitor of the MPT, in particular, the MPT of the FAS protein complex based on said analysis, or, alternatively or in combination, Preparing the MPT, in particular, the FAS protein complex, containing the candidate compound capable of inhibiting a MPT, in particular, the MPT present in the FAS protein complex for cryo-electron microscopy analysis;

Conducting cryo-electron microscopy with said MPT, in particular, the FAS protein complex;

Determining the suitability of the candidate compound as an inhibitor of the MPT, in particular, the MPT of the FAS protein complex.

That is, the methods described for identifying candidate compound capable of inhibiting the respective enzyme (ketoreductase, enoylreductase and MPT), in particular, inhibiting said enzyme present in the FAS protein complex include either a crystallization of said enzyme or protein complex containing said enzyme or alternatively or in combination examining said candidate compound interacting with the respective enzyme by cryo-electron microscopy.

In an embodiment the candidate compound may be a compound which inhibit at least two of the enzymes mentioned, for example, inhibiting both the ketoreductase and the enoylreductase.

For example, candidate compounds may be obtained from peptide libraries containing the mentioned inhibitory peptide sequences as described herein whereby these sequences are randomized by random mutation or site-directed mutation. Candidate compounds binding to the enzyme in question, in particular, one of the enzymes ketoreductase, enoylreductase or MPT are selected and introduced into the gamma-subunit, thus, allowing to determine the inhibitory activity on the respective enzyme. Of course, the candidate compounds also include compounds stabilizing the inhibitory interference of the natural inhibitory unit of the gamma-subunit. The skilled person is well aware of libraries and methods to determine usefulness of the candidate compounds.

In another aspect, a method for the design of an inhibitor of the enzyme activity present in the FAS protein complex is identified. Namely, a method for the design of an inhibitor of the ketoreductase activity, in particular, ketoreductase activity in the FAS protein complex comprising step of mutating a polypeptide of at least 6 consecutive amino acids of Seq ID No. 2, like at least 8 consecutive amino acids, e.g. at least 10 consecutive amino acids or a functional fragment thereof, or a homolog thereof by random or site-directed mutation of at least one of the amino acids of said polypeptide.

determining the suitability of inhibiting ketoreductase activity, in particular, ketoreductase activity of the FAS protein complex, is provided.

In another embodiment, a method for the design of an inhibitor of the enoylreductase activity, in particular, enoylreductase activity in the FAS protein complex comprising step of mutating a polypeptide of at least 5 consecutive amino acids of Seq ID No. 3, like at least 6 consecutive amino acids, e.g. at least 8 consecutive amino acids or a functional fragment thereof, or a homolog thereof by random or site-directed mutation of at least one of the amino acids of said polypeptide;

determining the suitability of inhibiting enoylreductase activity, in particular, enoylreductase activity of the FAS protein complex.

Finally, a method for the design of an inhibitor of the MPT activity, in particular, MPT activity in the FAS protein complex comprising step of mutating a polypeptide of at least 6 consecutive amino acids of Seq ID No. 4, like at least 8 consecutive amino acids, e.g at least 10, 12 or 14 consecutive amino acids of Seq ID No. 4, or a functional fragment thereof, or a homolog thereof by random or site-directed mutation of at least one of the amino acids of said polypeptide;

determining the suitability of inhibiting MPT activity, in particular, MPT activity of the FAS protein complex.

The design include the alteration or modification of the polypeptide as defined herein. That is, either the amino acid residue as such may be substituted with a different amino acid residue or, alternatively, the nucleic acid residue may be modified. Further modification include the chemical modification of at least one of the amino acid residue allowing click chemistry, thus, building covalent linkages to the interacting counterpart present in the enzyme. Thus, transient or permanent inhibition may be achieved. Further the inhibitor may be modified to include a receptor in the Michael reaction or Michael addition. Moreover, the inhibitor may contain a Schiff base building moiety which may react with Lys or His present in the interacting counterpart of the respective enzyme.

Moreover, the present invention provides an inhibitor of a ketoreductase, enoylreductase and/or MPT. Said inhibitor may be an inhibitor containing all three inhibitory moieties inhibiting the enzymatic activities mentioned, namely, inhibiting the KR, ER and MPT activity. The design of said inhibitor is such that the respective moieties can interact with the enzymatic counterparts. This is particularly true for an inhibitor of at least two of the enzymatic activities present in the FAS protein complex, e.g. the MPT an ER or MPT and KR as well as a combination of ER and KR or all three enzymatic activities.

Further, it is possible to envisage FAS protein complexes containing both a polypeptide or inhibitor as defined herein in combination. That is, the FAS protein complex may be a FAS protein complex with a gamma subunit of a recombinant polypeptide containing an insert while at the same time an inhibitor of at least one of the mentioned enzymatic activities is present. Moreover, further polypeptides of the present invention include polypeptides wherein at least one of the sequences or fragments thereof of Seq. ID No. 2, 3 and 4 are absent in a polypeptide of Seq ID No. 1. Said polypeptides may contain additional segment(s) to maintain the structure of the underlying gamma-subunit. The skilled person is well aware of the necessary amino acids to be present to ensure suitability of the respective polypeptide having the desired inhibitory properties. For example, the MPT inhibiting site is substituted with neutral, base and/or polar amino acid residues.

Finally, the present invention provides the inhibitor according to the present invention for use in the prophylaxis or treatment of cancer, infectious diseases, tuberculosis obesity, antibiotics against bacterial infections, in particular tuberculosis, or yeast infections.

The suitability of inhibitors of the FAS protein complex, either FAS I or FAS II, is discussed in the art. Consequently, the inhibitors of the present invention represents suitable inhibitors for treatment of diseases wherein the FAS protein complex is a target molecule for prophylaxis or treatment of said disease or disorder.

Discovery of a Yeast Fatty Acid Synthase Gamma Subunit

Figure 1:
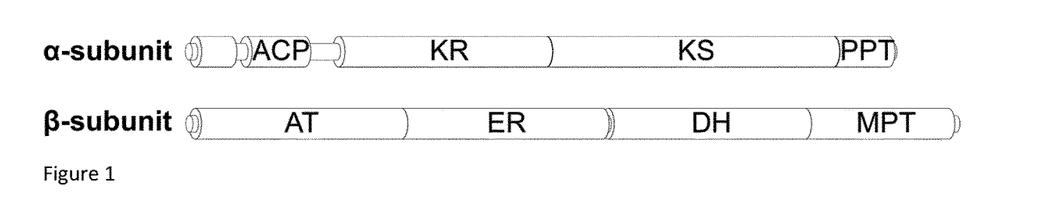
FIG. 1: Tma17p constitutes a bona fide γ-subunit of the yeast Fatty Acid Synthase. Together, the α- and β-subunits contain all enzymatic activities necessary for fatty acid synthesis. The acyl carrier protein (ACP, yellow), ketoreductase (KR, gold), ketosynthase (KS, orange) and phosphopantetheine transferase (PPT, magenta) domains reside on the α-subunit, while the acetyltransferase (AT, blue), enoylreductase (ER, teal), dehydratase (DH, green) reside on the β-subunit. The malonyl-/palmitoyl-transferase (MPT, khaki) domain is built up both by α- and β-subunits.
Figure 2A:
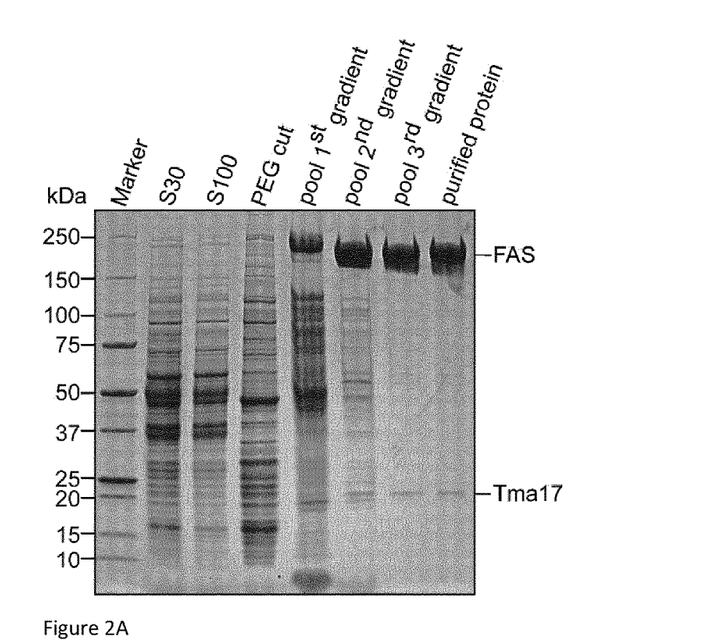

To mechanistically interrogate the structural determinants governing the iterative shuttling by yeast FAS, the inventors initially set out to establish a biochemical purification procedure that would yield highly active, biochemically and structurally homogenous FAS from the yeast S. cerevisiae. For this purpose, the inventors adapted the chromatography-free purification procedure the inventors had previously reported for 20S- and 26S proteasomes (J. Schrader et al., Science. 353, 594-8 (2016)) to the FAS. This approach relies on fractionated PEG precipitation and density gradient centrifugation as orthogonal purification steps e.g. se WO2017/211775 A1. This allows for very gentle purification at constant (low-) ionic strength, yielding 15-20 mg electrophoretically pure FAS from 233 g wet weight of S. cerevisiae cells. Surprisingly, under these purification conditions, the inventors found a protein with an apparent molecular weight of 20 kDa reproducibly co-purifying with FAS (FIG. 2a). Tandem mass spectrometry of tryptic digests identified this protein as Tma17p.

Figure 2B:
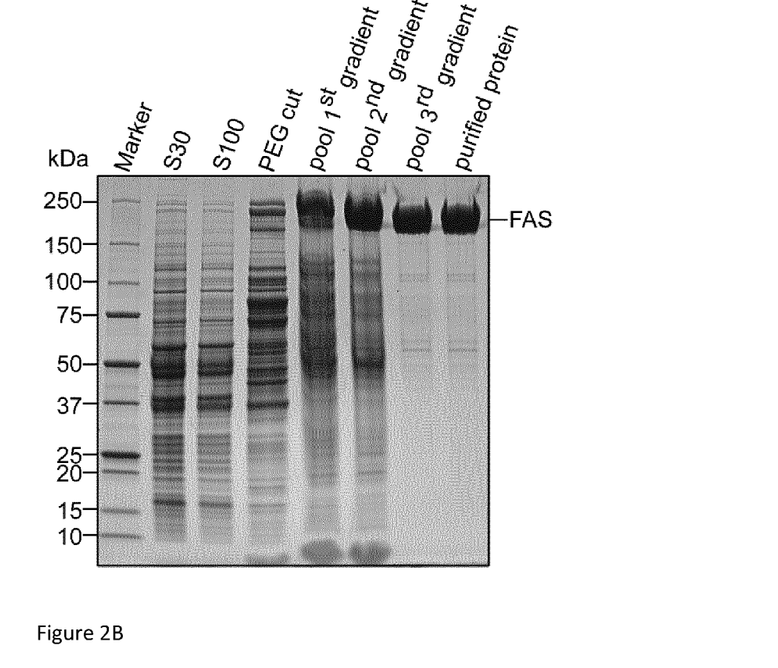
FIG. 2B SDS-PAGE analysis of FAS purification from a Δtma17 *S. cerevisiae* strain. Aliquots of the same fractions as in (D) are loaded. Note the absence of the protein with an apparent molecular weight of 20 kDa, indicating that this is indeed Tma17p.

An additional protein subunit of the yeast FAS has not been described in close to five decades of biochemical investigation of FAS. Tma17p has previously been described to be involved in cellular translation or proteasome assembly (T. C. Fleischer, et al., Genes Dev. 20, 1294-1307 (2006)). The co-purification and co-sedimentation of Tma17p with the FAS in the 40S region of the gradient, however, suggests a direct biochemical interaction. The inventors thus performed a series of control experiments to establish that Tma17p is indeed a bona fide interactor of the FAS. First, the inventors cross-validated the identification of the 20 kDa protein co-purifying with FAS as Tma17p. For this, the inventors generated a Δtma17 knockout yeast strain and purified FAS from this strain using the same protocol as described above, obtaining comparable amounts of FAS. However, as shown in FIG. 2b, when FAS is purified from the Δtma17 strain, the 20 kDa band is absent from the purified FAS fractions, corroborating the tandem-MS results. Second, the inventors investigated the biochemical stability of the interaction of Tma17p with FAS. For this purpose, FAS purified from a wild-type strain was loaded onto density gradients containing either 50 mM KCl, 150 mM KCl, or 250 mM KCl. Tma17p quantitatively dissociates from the FAS at 250 mM KCl, which results in the sedimentation of Tma17p in the top fractions of sucrose density gradients, in the same way as recombinant Tma17p. At 150 mM KCl roughly half of the Tma17p co-purified with FAS was dissociated, whereas at 50 mM KCl co-purified Tma17p remained firmly associated to FAS and co-sedimented along with FAS in the 40S region. Third, the inventors investigated whether addition of recombinant Tma17p to ΔTma17p-FAS could reconstitute the FAS-Tma17p complex. For this, ΔTma17p-FAS was incubated with increasing amounts of recombinant, fluorescently labelled Tma17p and analyzed by native gel electrophoresis on agarose gels, followed by quantification of fluorescence of FAS-bound Tma17p. In this setup, labelled Tma17p migrated close to the front, whereas FAS migration was considerably retarded owing to its native molecular weight of 2.6 MDa. Binding of Tma17p to FAS results in the shift of its mobility to a position where it co-migrates with FAS.

This experiment revealed a positive cooperative binding of Tma17p to the FAS with a $K_{0.5}=2.1\pm0.2$ μM and a Hill coefficient of $n_H=2.1\pm0.3$, suggesting that multiple copies of Tma17p can bind simultaneously to one FAS molecule. Taken together, these experiments indicate that Tma17p is a weakly associated, integral subunit of the yeast FAS. Tma17p is widely conserved in yeasts and appears to have escaped identification as a FAS subunit due to the relatively high-salt conditions previously employed in the art to purify FAS. Henceforth, the inventors will refer to Tma17p as the FAS γ-subunit and FAS bound to the γ-subunit as the FAS holoenzyme.

The Gamma Subunit Stabilizes a Rotated FAS Conformation

Figure 3:
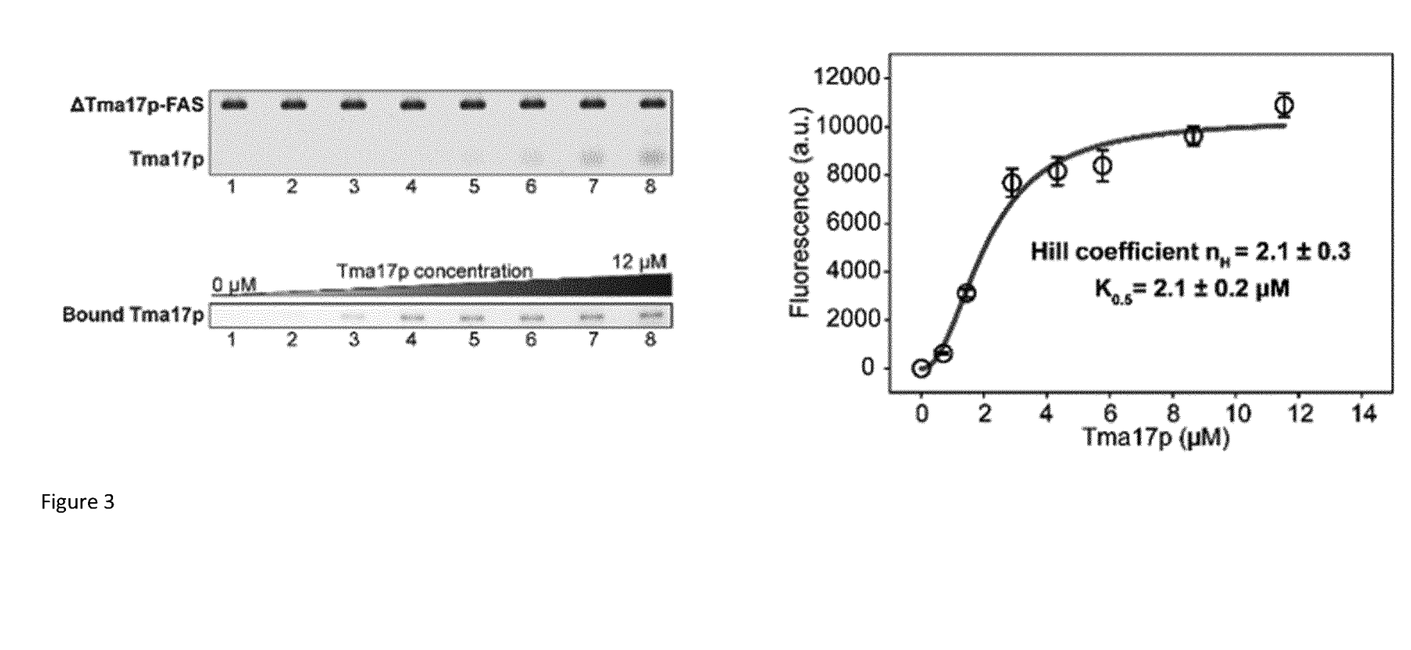
FIG. 3 Reconstitution of the FAS holoenzyme with ΔTma17p-FAS and recombinant Tma17p. The top left depicts a Coomassie-stained native gel, where the positions of migration of ΔTma17p-FAS and Tma17p are indicated. The bottom left panel shows a fluorescence detection of the ΔTma17p-FAS region of the gel to visualize FAS-bound Tma17p, the right panel represents the quantitative analysis of the fluorescence signal.

Having established that Tma17p constitutes an authentic γ-subunit of FAS, the inventors asked whether binding of the γ-subunit impacts the structure of FAS. Therefore, the inventors grew crystals of ΔTma17p-FAS, which belong to the primitive monoclinic space group $P2_1$ with unit cell constants of a=217.6 Å, b=347.6 Å, c=265.3 Å, β=107.9°, that contain a single ΔTma17p-FAS in the asymmetric unit and diffracted X-rays to 2.9 Å. The structure was solved by molecular replacement using the 3.1 Å S. cerevisiae structure previously reported (M. Leibundgut, et al., Science. 316, 288-90 (2007)), and revealed excellent electron density throughout the molecule, including the PPT and ACP domains. Analysis of the diffraction data with the STARANISO server indicated mild anisotropy. Anisotropic truncation of the data improved the refinement of the model, resulting in lower average B-factors and $R/R_{free}$ of 19.2%/21.1%. The inventors were also able to obtain a ΔTma17p-FAS structure by cryo-EM from 144,526 particles at global resolutions, estimated using the 0.143 FSC criterion, of 2.9 Å with applied D3 symmetry, 3.0 Å with applied C3 symmetry and 3.3 Å in asymmetric reconstructions, with small local resolution differences. The ΔTma17p-FAS crystallographic model was refined against all three EM maps and resulted in models with an overall r.m.s.d. of 1 Å with respect to the crystal structure, but less than 0.2 Å r.m.s.d. amongst the different symmetric reconstructions. The inventors then proceeded to determine the structure of the FAS holoenzyme by reconstituting ΔTma17p-FAS with the recombinant γ-subunit as described above in FIG. 3. At saturating conditions of the γ-subunit, the inventors were able to reconstruct a cryo-EM structure from 110,597 single particles at a global resolution, estimated using the 0.143 FSC criterion, of 2.8 Å with applied D3 symmetry, 2.9 Å with applied C3 symmetry and 3.2 Å in asymmetric reconstructions with small local resolution differences. The quality of the FAS holoenzyme cryo-EM structure was comparable to that of the ΔTma17p-FAS structure and allowed equally reliable model building. The inventors were also able to obtain crystals of the FAS holoenzyme, which belong to the primitive monoclinic space group $P2_1$ with unit cell constants of a=234.9 Å, b=430.3 Å, c=422.6 Å, R=97°, that contain two FAS holoenzymes in the asymmetric unit, and diffracted X-rays to 4.6 Å resolution. The inventors solved the crystal structure of the FAS holoenzyme by molecular replacement using the ΔTma17p-FAS crystal structure described above, which allowed for the reliable modelling of a Cα-trace. Models of the FAS holoenzyme refined against all three (symmetric and asymmetric) cryo-EM maps resulted in models with an overall r.m.s.d. of 0.8 Å with respect to the crystal structure, but less than 0.2 Å r.m.s.d. amongst the different symmetric reconstructions. The similarity amongst the models derived from cryo-EM and X-ray crystallography of both ΔTma17p-FAS and the FAS holoenzyme, enables a reliable and conclusive interpretation of the structural impact of γ-subunit binding. These findings are independent of crystal contacts and imposed symmetry in determination of the cryo-EM structures and provide a robust cross-validation of the structural data.

Movement of the Dynamic ACP Domain by the Gamma Subunit

Figure 4:
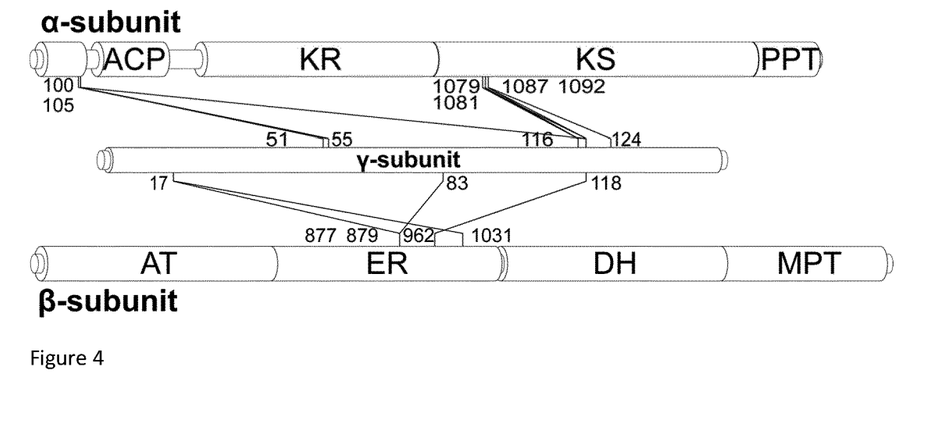

Structural comparison of both the cryo-EM and crystal structures of ΔTma17p-FAS with the FAS holoenzyme revealed several differences: 1) The β-subunits of the FAS holoenzyme structure are rotated by ~15°, with respect to the central 3-fold symmetry axis, at the top of the dome where neighboring β-subunits meet. This results in an inward shift of the AT domain, an outward shift of the MPT domain, and an overall compaction of the FAS holoenzyme structure by 10 Å. This rotation of the FAS β-subunits appears to be driven mainly by rigid-body motions rather than conformational changes within the enzymatic domains of the FAS holoenzyme. 2) In the ΔTma17p-FAS structure, all ACP domains are found in proximity to the KS site, at the same position as reported in previous FAS crystal structures (P. Johansson et al., Proc. Natl. Acad. Sci. U.S.A 105, 12803-12808 (2008)). In striking contrast, in the FAS holoenzyme cryo-EM structure, all ACP domains are found in proximity to the AT domain. This ACP domain position is readily verified by positive difference density- and omit-maps of the FAS holoenzyme crystal structure. 3) The inventors found additional density that could be modelled as a coiled-coil segment directly below the ACP domain in the FAS holoenzyme cryo-EM structure that was absent in the ΔTma17p-FAS cryo-EM and X-ray crystal structures. This observation was cross-validated in difference density- and omit-maps of the FAS holoenzyme crystal structure, and is likely to represent the γ-subunit. The inventors tested this hypothesis by crosslinking mass spectrometry (XL-MS) of the FAS holoenzyme (FIG. 4). XL-MS revealed an interaction of the N-terminal part of the γ-subunit with the ER domain, a spatial proximity of the central part of the γ-subunit to the MPT domain, and an association of the C-terminal part of the γ-subunit with the KR and KS domains. Guided by the XL-MS results and structural features corresponding to side-chain densities in the cryo-EM map, the inventors were able to build an atomic model for the γ-subunit associated with FAS. Closer inspection of the mode of interaction of the γ-subunit within the FAS holoenzyme revealed that the N-terminal part occludes the ER active site, whereas the C-terminal 18 residues of the γ-subunit occupy the KR domain active site, suggesting a steric competition for NADPH binding in both domains. In addition, while the 16 amino-acid loop segment connecting the two α-helices of the γ-subunit is poorly resolved in both the EM- and crystal structure-maps of the FAS holoenzyme, it is likely to occupy a position next to the MPT domain.

Functional and Conformational Impact of the Gamma Subunit

Figure 5:
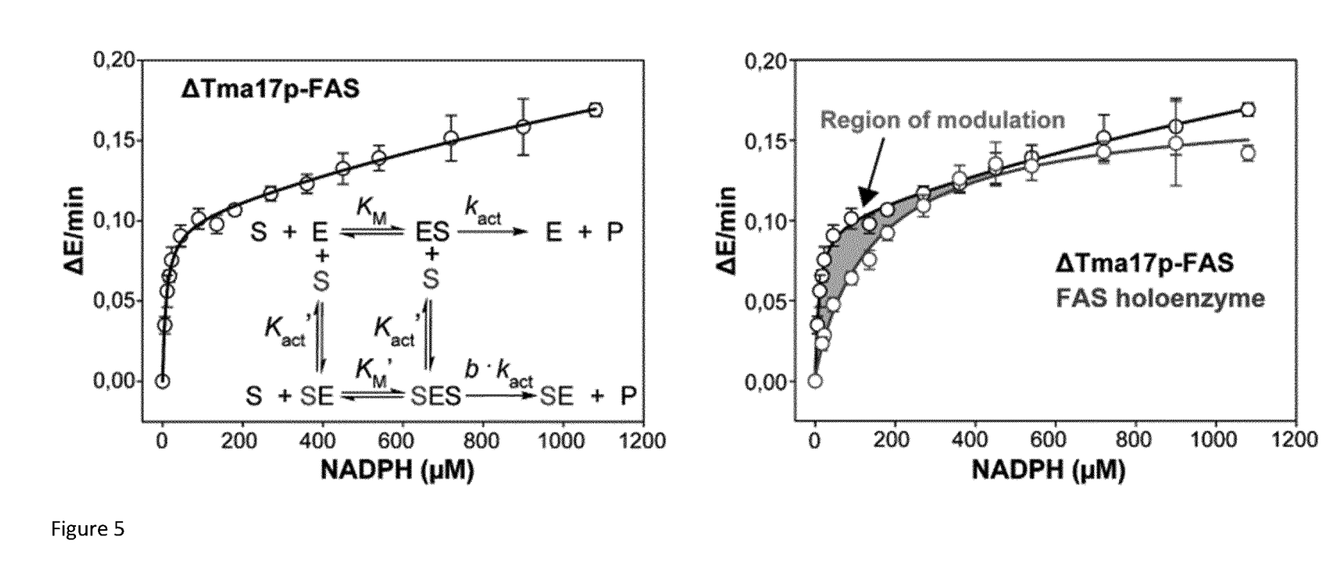

What then is the biological function of the γ-subunit in the FAS holoenzyme? This protein is not required for enzymatic activity per se, since most enzymatic studies of the yeast FAS to date were performed in the absence of the γ-subunit. The structural mode of binding of the γ-subunit within the FAS holoenzyme, suggests a partial inhibition of the enzymatic activities within the FAS holoenzyme through impaired substrate binding, and thus would be expected to have a most prominent effect on the reductase activities. To test this, the inventors analyzed the steady-state kinetics and measured the rates of substrate turnover of ΔTma17p-FAS with respect to varying concentrations of all substrates, specifically acetyl-CoA, malonyl-CoA and NADPH. This analysis revealed saturation kinetics for both acetyl-CoA and malonyl-CoA, the binding of which were partially inhibited by the addition of saturating amounts of the γ-subunit. Binding of the γ-subunit resulted in a 2-fold decreased affinity for acetyl-CoA and a 4-fold decreased affinity in the case of malonyl-CoA. In contrast, the analysis of rates at different concentrations of NADPH was more complex and suggested a substrate-dependent activation model in the case of ΔTma17p-FAS (FIG. 5) with E (enzyme), S (substrate), ES (cognate enzyme substrate complex), SE (non-cognate or weak affinity enzyme substrate complex), SES (simultaneous non-cognate/weak affinity and cognate enzyme substrate complex). The FAS holoenzyme, however, exhibited a classic, hyperbolic Michaelis-Menten dependence for NADPH. At saturating concentrations of the γ-subunit, the $K_M^{app}$ for NADPH is increased in comparison to ΔTma17p-FAS (FIG. 5). Together, the kinetics data and the structural findings described in herein show that the γ-subunit partially impacts the enzymatic activity within the FAS holoenzyme, in particular the reductase activities, such that the dynamic range of NADPH substrate dependence is broadened to accommodate differences in cellular metabolism. This would allow cells to regulate FAS activity over an enhanced concentration regime of NADPH and $NADP^+$.

Additionally, the structural data described herein indicate that binding of the γ-subunit impacts the conformational landscape of the FAS megaenzyme. A rotated, compacted conformation with axially positioned ACP domains is favored in the presence of the γ-subunit, while a non-rotated conformation with equatorially located ACP domains is adopted in its absence. To address this hypothesis, the inventors first examined by EM whether titration of the γ-subunit into ΔTma17p-FAS would cause an increase in the fraction of single particles adopting the rotated, compacted conformation. To this end, the inventors collected several cryo-EM datasets of the FAS holoenzyme reconstituted with different amounts of the γ-subunit. The inventors then refined 3D structures from each individual dataset, and analyzed the relative abundance of particles corresponding to populations of either the non-rotated- or the rotated conformation. Quantification indicated a clear correlation of the rotated conformation with the amount of γ-subunit used for reconstitution. While in the ΔTma17p-FAS sample 2% of selected particles correspond to the rotated state, this increases to 88% at a 6-fold excess and 95% at a 12-fold molar excess of the γ-subunit.

To assess the conformational changes induced by binding of the γ-subunit in a quantitative manner, the inventors next applied their formerly established cryo-EM method of 3D classification combined with the calculation of energy landscapes (D. Haselbach et al., Cell. 172, 454-458.e11 (2018)). For this purpose, the inventors initially refined 3D structures of the individual datasets with a mask corresponding to the central wheel, which is indistinguishable in conformation in both the non-rotated and rotated structures. To gain insight into the conformational space occupied by the dome in each individual dataset, the inventors then performed a 3D-classification without alignment in batches of 6,500 particles each, relying exclusively on the alignment parameters of the central wheel previously obtained. The individual 3D classes thus obtained were individually refined to ensure their validity and subsequently subjected to 3D principal component analysis (PCA). The first eigenvector of this 3D PCA describes the compaction of the dome, whereas the second eigenvector signifies the notable rotation of the dome. Since the inventors have an exact knowledge of the number of particles in each 3D class, the inventors are able to map an energy landscape by performing a Boltzmann interpolation within a coordinate system that is defined by the first and second eigenvectors of the PCA. The energy landscapes for each individual dataset recapitulate the observation that binding of the γ-subunit and ensuing formation of the FAS holoenzyme results in the adoption of the rotated conformation. Moreover, the energy landscapes indicate that binding of the γ-subunit results in the formation of an energy barrier restricting access to the non-rotated conformation.

Initial proof-of-principle experiment have been performed, which clearly shows that the γ-subunit can indeed be used as a scaffold to introduce proteins into the FAS chamber. The rationale for this experiment is as follows: the flexible linker segment between the coiled-coil and KR binding segment (residues 114-132) of the γ-subunit has been replaced either with a single (15 kDa in size) copy, or two (30 kDa in size) copies of a small fluorescent protein UnaG. The resulting UnaG-γ-subunit fusion proteins were then reconstituted with Δγ-FAS and the mixture fractionated on sucrose density gradients. The gradients were imaged under UV illumination, fractionated and individual fractions subjected to SDS-PAGE to reveal the proportion of the respective UnaG-γ-subunit fusion protein co-sedimenting with FAS in the 40S range. No protein sediments along with FAS in the control. In contrast, in the case of the single UnaG-γ-subunit fusion construct a substantial increase in green fluorescence is visible as well as a significant proportion of the UnaG-γ-subunit fusion protein is found co-sedimenting with FAS in SDS-PAGE. In the case of the double UnaG-γ-subunit fusion construct, one can see some increase in fluorescence, which is increased in comparison to the FAS control but less than in the case of the single UnaG-γ-subunit fusion construct. SDS-PAGE analysis of the double UnaG-γ-subunit fusion protein Δγ-FAS reconstitution experiment reveals that the amount of the double UnaG-γ-subunit fusion protein reconstituted with FAS is reduced in comparison to the single UnaG-γ-subunit fusion protein.

Taken together, this proof-of-principle experiment reveals that the strategy using the γ-subunit as a scaffold to introduce enzymatic modules into the FAS dome in principle works for proteins.

This proof-of-principle experiment has been taken further: A TesA-γ-subunit fusion by replacing residues 114-132 of the γ-subunit with the sequence encoding for the E. coli Thioesterase A (TesA) has been generated. The function of thioesterases lies in the recognition of lipid chains covalently to the acyl carrier protein and their release after catalyzed hydrolysis to free fatty acids (FFA). FFAs industrially represent highly important synthetic precursors to fine chemicals. The TesA-γ-subunit fusion protein construct was produced recombinantly in E. coli and purified to near homogeneity. The TesA-γ-subunit fusion protein could be reconstituted with Δγ-FAS in similar efficiency as the single UnaG-γ-subunit fusion protein described above. Activity assays determine the activity of TesA in the TesA-γ-subunit fusion protein described above reconstitution with Δγ-FAS.

Conclusions

Herein, the identification of a novel γ-subunit of the yeast FAS megaenzyme complex is demonstrated, which most likely has escaped detection thus far due to the relatively high-salt conditions employed to purify FAS. The γ-subunit, which was previously characterized as either ribosome-associated (as Tma17p) or involved in the assembly of proteasomes (as Adc17p), can now be firmly brought in conjunction with cellular fatty acid biosynthesis in yeast.

The observed weak interaction of the γ-subunit with FAS could potentially suggest non-specific binding. However, this can be firmly ruled out by the following experimental evidence: 1) Structure elucidation by both cryo-EM and X-ray crystallography shows that the γ-subunit directly influences the conformational landscape adopted by FAS, with a non-rotated state preferentially occupied in its absence and a rotated state stabilized by its binding. Binding of the γ-subunit appears to introduce an energy barrier for the FAS to attain the non-rotated conformation. 2) Closer inspection of the non-rotated and rotated states shows that the former is associated with ACP domains occupying a position adjacent to the KS domain as previously described in the art, whereas an ACP position neighboring the AT domain is characteristic of the latter state. 3) Thorough inspection of the rotated state structures has led to the identification of an additional density in proximity to the ACP domains positioned at AT domains. Using XL-MS and model building, the inventors were able to unambiguously assign this coiled-coil-shaped density to the γ-subunit. The inventors were further able to determine that the N-terminal 24 residues of the γ-subunit sterically occlude the ER active site, and could trace the C-terminal 18 residues of the γ-subunit as occupying the KR active site and sterically competing for NADPH binding. 4) These findings are suggestive of a modulation of the reductase activities of the FAS holoenzyme, which the inventors were able to confirm by steady-state enzyme kinetics in FIG. 5. For the FAS holoenzyme, the inventors found a 15-fold reduction in the binding affinity for NADPH and the exhibition of saturation, and classical Michaelis-Menten kinetics in the presence of the γ-subunit. In its absence, the kinetic mechanism is more complex and the affinity for NADPH stronger. These results indicate that an additional function of the γ-subunit might be to couple fatty acid synthesis with the cellular abundance of NADPH.

In conclusion, in addition to the mechanistic implications arising from the identification of a γ-subunit of the FAS holoenzyme, some clear important biotechnological implications arise. 1) Considering the inhibitory effect elicited by the γ-subunit with regard to FAS reductase activities, yeast strains with genetic deletions of the γ-subunit gene will be beneficial for the biotechnological production of fatty acids and biofuels by yeasts. 2) One can foresee the exploitation of the natural γ-subunit structural scaffold for the introduction of known and designed enzymatic modules absent in wild type fatty acid synthases, such as desaturases, into the FAS reaction chamber. In particular, replacement of the linker segment between the C-terminus of the coiled-coil and the KR-binding segments appears predestined for this purpose. 3) Genetic engineering, segmentation and affinity maturation may allow the manipulation and exploitation of the ER- and KR-binding segments of the γ-subunit into generalized fatty acid synthase inhibitors. Such compounds will be beneficial for the treatment of diverse ailments including tuberculosis, obesity and cancer.

Methods

Binding Affinity of the γ-Subunit to FAS

To determine the binding affinity of the γ-subunit to the FAS, γ-subunit was labelled with NHS-Rhodamine (Thermo Fisher Scientific) according to the manufacturer's recommendations, followed by passage through a desalting column to remove excess unreacted dye. Different concentrations of NHS-Rhodamine labelled γ-subunit were titrated against 15.38 pmol ΔTma17p-FAS in assay buffer in a total reaction volume of 40 µl. The mix was incubated at 30° C. for 30 minutes. 10 µl of each reaction were then loaded onto a 1.5% (w/v) agarose gel (in 0.5×TBE, 2 mM $MgCl_2$) and run at 75 mA for 2 hours at 4° C. The fluorescence signal from the γ-subunit-FAS complex was imaged using an Amersham imager 600 (GE Healthcare) and quantified using ImageJ Schindelin et al., Nat. Methods. 9, 676-682 (2012)). The dissociation constant of the γ-subunit was calculated using the Hill equation.

Salt Concentration-Dependent Dissociation of the γ-Subunit

FAS holoenzyme (0.52 mg) was loaded on linear 10-45% (w/v) sucrose gradients in purification buffer containing 10 mM DTT supplemented with either 0, 100, or 200 mM KCl. The gradients were centrifuged at 120,000×g for 16 h at 4° C. and were harvested in 200 µl fractions. All fractions of the gradients at the three salt concentrations were then analyzed by SDS-PAGE.

Preparative Reconstitution of the FAS Holoenzyme

For reconstitution of the FAS holoenzyme, a 100-fold excess of the γ-subunit was added to 4 µM ΔTma17p-FAS and incubated at 30° C. for 30 min. The protein was then loaded on 10-45% (w/v) sucrose gradients in purification buffer containing 10 mM DTT, and then centrifuged at 64,000×g for 16 h at 4° C. Gradients were harvested in 400 µl fractions. The inventors then used SDS-PAGE to identify fractions containing FAS holoenzyme. Selected fractions were pooled and precipitated by the addition of 40% (v/v) PEG400. After centrifugation (30,000×g, 30 minutes), the supernatant was removed and the precipitate was resuspended in purification buffer containing 10% (w/v) sucrose, 10 mM DTT and 0.01% (w/v) LMNG to a final concentration of 10 mg/ml.

EM Sample Preparation

EM grids were prepared using both ΔTma17p-FAS and FAS holoenzyme complexes at a protein concentration of 0.5 mg/ml. The particles were adsorbed to a continuous carbon film attached to a Quantifoil (3,5/1) (Quantifoil, Jena, Germany) grid for 2 min at 4° C. The grid was then transferred to a Vitrobot Mark IV (Thermofisher, Germany) plunge-freezer, where it was vitrified after blotting for 8 s at 4° C. and 100% humidity. For γ-subunit titration experiments, 1.5 mg/ml ΔTma17p-FAS solution was used and recombinant, purified γ-subunit was titrated in 0-, 2-, 6-, 24-, and 96-fold excess. The protein mix was incubated at 30° C. for 30 min and then kept at 4° C. 4 µl of each sample was applied to freshly glow-discharged Quantifoil R1.2/1.3 holey carbon grids (Quantifoil Micro Tools, Jena, Germany) followed by plunge freezing as described above.

Cryo EM Data Collection and Image Processing

Data were acquired on a Titan Krios (Thermo Fisher Scientific) operating at 300 kV using either a Falcon 3 (integrated mode) camera or a K2 summit (counting mode) camera (Gatan, Inc.). Data collection and processing statistics are summarized in Table S3. The acquired movies were motion corrected and dose weighted using Motioncor2 (S. Q. Zheng et al., Nat. Methods. 14, 331-332 (2017)) with all the frames split into 5×5 patches. The aligned frames were used to perform per micrograph CTF estimation using GCTF (K. Zhang, J. Struct. Biol. 193, 1-12 (2016)). Particle selection was done using Gautomatch (https://www.mrc-lmb.cam.ac.uk/kzhang/Gautomatch/). All subsequent image processing steps were performed with Relion 3.0 (J. Zivanov et al., Elife. 7 (2018), doi:10.7554/eLife.42166), unless otherwise specified. The extracted particles were subjected to 3 rounds of reference free 2D classification to remove bad/empty images. The remaining particles were refined with a mask around the central wheel using D3 symmetry. EMDB-1623 was low pass filtered to 30 Å and used as reference for all 3D refinement and 3D classification procedures. The refined particles were then classified without alignment, with a mask around the two domes. The conformation of the dome was consistent among the different classes obtained, however, it was well resolved only in one class which consisted of ~50-60% of the particles used for classification. The particles from the 3D class displaying the best resolution were selected and used for one more round of 3D refinement and classification as performed before. The data further classified into 3 main classes. The particles belonging to their respective classes were refined resulting in structures with resolutions of 3.5 Å or below. Even though all the 3 classes were at comparable resolutions, their local resolutions, especially in the dome region of the molecule were very different. Only one class displayed high resolution details throughout the whole molecule. Finally, the particles belonging to this class were selected and used to perform CTF refinement (and particle polishing for the FAS holoenzyme dataset) followed by 3D refinement. The final refinement step was performed by applying different symmetries (C1-, C3- or D3 symmetry) to check for any structural artefacts that might be introduced due to the applied symmetry.

Energy Landscapes

The data were processed as described above until the first classification step. For this analysis, batches of ~100,000 particles were classified into 15 classes. The particles belonging to each class were selected and refined again without applying any masks. The refined 3D volumes from each dataset (a total of 165) were then used for the conformational landscape analysis as previously described (D. Haselbach et al., *Nat. Commun.* 8, 1-8 (2017)). The 3D volumes were first aligned in USCF Chimera (E. F. Pettersen et al., *J. Comput. Chem.* 25, 1605-1612 (2004)) with the central wheel of the molecule as the reference point. Further steps were performed in the COW software suite (www-.cow-em.de). The 3D volumes were normalized and filtered to 20 Å. The inventors then performed 3D Principle Component Analysis (PCA) to obtain the major modes of motion among the different samples. The resultant eigenvectors representing the variance in the data were sorted based on decreasing significance and then used to describe each 3D volume using the following equation $$X_i = \overline{X} + \Sigma_{j=1}^n a_{i,j} e_i \qquad (1)$$

, where every volume $X_i$ is described as a linear combination of the average volume $\overline{X}$ and the eigenvectors $e_i$ multiplied with the linear factor $a_{i,j}$. The first ($e_1$) and second ($e_2$) eigenvectors, which depict motions of compaction and rotation of the FAS dome, respectively, were selected for calculating conformational landscapes. The particle number belonging to each class was used to calculate their free energies as multiples of the Boltzmann factor ($k_B T$):

$$\Delta\Delta G = k_B T \ln\left(\frac{p_i}{p_0}\right) \qquad (2)$$

, where T is the absolute temperature, $k_B$ the Boltzmann constant, $p_i$ is the number of particles in state i and $p_0$ is the number of particles in the most populated state. The linear factors of $e_1$ and $e_2$ calculated as per equation (1) contributing to the input 3D volumes represent the x and y coordinates of the landscapes whereas the z axis represents the free energies of each class.

Crystallization and Stabilization

ΔTma17p-FAS in purification buffer containing 10% sucrose (w/v), 10 mM DTT and 0.01% (w/v) LMNG was crystallized at 7 mg/ml by mixing 1 μl protein+1 μl crystallization buffer A in Crystalgen hanging drop diffusion plates (Jena Bioscience, Germany) over a 750 μl reservoir of crystallization buffer A. For the FAS holoenzyme, a 7-fold molar excess of γ-subunit (in the buffer used for ΔTma17p-FAS) was added to a 7 mg/ml protein solution of ΔTma17p-FAS and incubated for 30 minutes at 30° C. The reconstituted complex was then crystallized by mixing 1 μl protein+1 μl crystallization buffer B in Chryschem sitting drop vapor diffusion plates (Hampton Research, Aliso Viejo, USA) over a 500 μl reservoir of crystallization buffer B. The crystals took 3-7 days to grow at 18° C. and were usually around 150×200×200 μm in size.

The crystals obtained were transferred to 4° C. by gradually decreasing the temperature in a linear manner over 48 h using a Rumed® E100 incubator (Rubarth Apparate GmbH, Germany). Stabilization and dehydration procedures were performed as following: 1) The drop was unsealed and 2 μl of the reservoir solution was added to the drop. Then 2 μl of crystal stabilization buffer (A for ΔTma17p-FAS, B for FAS holoenzyme) was added. 2) 2 μl of crystal stabilization buffer containing 5% (v/v) ethylene glycol was added followed by removal of 2 μl of solution from the drop. Then 2 μl of crystal stabilization buffer containing 5% (v/v) ethylene glycol was again added to the drop. This procedure was repeated with crystal stabilization buffer containing 10% and then 20% (v/v) ethylene glycol. 3) The reservoir solution was exchanged for crystal stabilization buffer containing 25% (v/v) ethylene glycol and the drop was resealed. The crystals were then allowed to equilibrate by vapour diffusion in excess of 16 h.

X-Ray Diffraction Data Collection

The crystals were harvested in Spine Litholoops (Molecular Dimensions, Suffolk, UK or Jena Bioscience, Jena, Germany) mounted on magnetic pins, and vitrified by plunge-cooling in liquid nitrogen. The data were collected on EMBL beam line P14 at the PETRA III storage ring (DESY, Hamburg, Germany) using a MD3 vertical-spindle diffractometer (EMBL and Arinax, Moirans, France) and an EIGER 16 M detector (Dectris, Baden, Switzerland). A white beam refractive lens transfocator and slits were used to obtain homogenous X-ray beams which matched the crystal dimensions (J. Schrader et al., *Science.* 353, 594-8 (2016)). Diffraction data were scaled and integrated with the XDS program package (W. Kabsch, IUCr, *XDS. Acta Crystallogr. Sect. D Biol. Crystallogr.* 66, 125-132 (2010)).

X-Ray Structure Determination

Initial phases for ΔTma17p-FAS were determined by molecular replacement performed with MOLREP (A. Vagin, A. Teplyakov, *Acta Crystallogr. Sect. D Biol. Crystallogr.* 66, 22-25 (2010)) using the *Saccharomyces cerevisiae* FAS structure (PDB ID: 2UV8). The model was built and optimized by several rounds of interactive manual model building in Coot (P. Emsley, K. Cowtan *Acta Crystallogr. Sect. D Biol. Crystallogr.* 60, 2126-2132 (2004)) and refinement in Refmac5 (G. N. Murshudov et al., *Acta Crystallogr. D. Biol. Crystallogr.* 67, 355-67 (2011)). Finally, TLS refinement was performed, where each TLS domain was defined by individual enzymatic domains. The obtained structure displays excellent stereochemistry with 19.4%/21.4% (R/R$_{free}$). Analysis of the diffraction data with the STARANISO server indicated mild anisotropy. This suggested anisotropic scaling and truncation of the data should allow for better refinement of the model. This was indeed the case and resulted in a final model with lower average B-factors and 19.2%/21.1% (R/R$_{free}$).

The refined ΔTma17p-FAS crystal structure was used to determine the initial phases by molecular replacement with MOLREP for the FAS-holoenzyme diffraction data. The obtained density map was found to correlate better with the FAS holoenzyme model (as determined by cryo-EM) rather than the ΔTma17p-FAS structure. Therefore, the inventors used the model of α- and β-subunits from the FAS holoenzyme cryo-EM model in initial refinement of the X-ray data. Notably, the ACP domain and the γ-subunit were removed from the structure prior to refinement to avoid introducing a phase bias. After several rounds of rigid body refinement in Refmac5, difference densities corresponding to the ACP domain and γ-subunit next to the AT and ER domain, respectively could be easily identified. The missing domains were then placed into their respective densities followed by additional rounds of refinement using Coot and Refmac5. Owing to the resolution of the FAS holoenzyme structure, the inventors have chosen to deposit the structure as a poly-Ala trace only.

EM Model Building

The crystallographic ΔTma17p-FAS model was used as the initial model for both the ΔTma17p-FAS and FAS holoenzyme structures determined by cryo-EM. It was docked into the EM densities as a rigid body using UCSF Chimera, see above. An additional round of rigid body refinement was then performed in Refmac5. The model then underwent several rounds of manual modelling in Coot and refinement in Refmac5. Several models for the γ-subunit were generated based on sequence homology using the Robetta (D. E. Kim, et. al., *Nucleic Acids Res.* 32, W526-31 (2004)) prediction server. All of them were docked into the "extra density" in the FAS holoenzyme map using UCSF Chimera. The model with the best fit was then manually modelled into the density based on the cross-linking data as well as side chain densities that were visible. There were two unstructured regions (60-76, 114-132) of this protein that could not be confidently modelled.

For the final refinement and validation of the models, the inventors used the maps reconstructed using D3 symmetry as they had the best resolution. Fourier shell correlation (FSC) between the refined model and the map was calculated (FSC$_{sum}$). The model was also refined using the first unfiltered half-map. This model was then compared to the first half map (FSC$_{work}$) as well as to the second half-map (FSC$_{free}$) to check for signs of overfitting. All figures were made using Pymol (L. Schrödinger, Version 1.8" (2015)), Chimera and ChimeraX (T. D. Goddard et al., *Protein Sci.* 27, 14-25 (2018)).

Materials

Standard chemicals were obtained from Sigma Aldrich (Taufkirchen, Germany). Detergents were obtained from Anatrace (Maumee, USA), crystallization plates from Hampton Research (Aliso Viejo, USA) and Jena Bioscience (Jena, Germany), Litholoops from Molecular Dimensions (Suffolk, UK) and Jena Bioscience (Jena, Germany). A Rumed® E100 incubator from Rubarth Apparate GmbH (Hannover, Germany) was used to transfer crystallization plates to 4° C. EM grids were from Quantifoil (Jena, Germany). *S. cerevisiae* cells were grown in a 250 L fermentor from Infors GmbH (Delitzsch, Germany), yeast cells were ground in a ZM200 mill from Retsch (Haan, Germany), *E. coli* cells were disrupted using an Emulsiflex C3 fluidizer from Avestin (Mannheim, Germany) and fluorescence from native gels was measured using an Amersham imager 600 (GE Healthcare, Munich, Germany).

Methods

Yeast Culture

All yeast manipulations were performed as per standard protocols (27). *Saccharomyces cerevisiae* strains BJ2168 (MATa prc1-407 prb1-1122 pep4-3 leu2 trp1 ura3-52 gal2) and tma17Δ BJ2168 (MATa prc1-407 prb1-1122 pep4-3 leu2 trp1 ura3-52 gal2 tma17::kanMX) were used in this study. Cells were grown in YPD medium in an Infors 250 litre fermenter and harvested in late log phase at an OD$_{600}$ of 9-10. Subsequently, cells were washed with cold ddH$_2$O and then resuspended in 2× purification buffer containing 20% (w/v) sucrose such that 2 ml of buffer was added per gram of cells. Cells were then flash frozen as beads in liquid nitrogen and stored at −80° C. until further use.

Purification of Yeast FAS

The purification strategy was adapted from protocols developed earlier for the purification of human 20S and 26S proteasomes (D. Haselbach et al., *Nat. Commun.* 8, 1-8 (2017)). We started with 700 g of frozen cell beads (corresponding to 233 g wet cell weight of yeast), which were ground in liquid nitrogen to a fine powder using a Retsch ZM200 mill. The ground powder was thawed in a water bath at 37° C., supplemented with purification buffer to 0.33× concentration from a 10× stock, followed by the addition of sucrose powder to 20% (w/v), benzamidine chloride to 10 mM and PMSF to 1 mM (from a 100 mM stock solution in propanol). The extract was incubated at 25° C. on a magnetic stirrer for 30 minutes followed by centrifugation at 30,000×g for 30 minutes at 4° C. After centrifugation, the supernatant was filtered through 3 layers each of cheese cloth and miracloth to obtain a S30 yeast cell extract. To this, Octyl Glucose Neopentyl Glycol (OGNG) (from a 10% (w/v) stock) was added to a final concentration of 0.2% (v/v) and the extract was incubated at 30° C. for 30 minutes followed by centrifugation at 100,000×g for 1 hour at 4° C. The supernatant was again filtered through 3 layers each of cheese cloth and miracloth. The thus clarified S100 extract was subjected to differential precipitation with PolyEthyleneGlycol400 (PEG; number signifies the mean molecular weight of the PEG polymer). PEG400 was added to a concentration of 20% (v/v) to the yeast S100 extract while stirring at 18° C. and incubated for 30 minutes. Precipitated proteins were removed by centrifugation at 30,000×g for 30 minutes at 4° C. The supernatant was then precipitated by raising the concentration of PEG400 to 30% (v/v) as described above. The precipitate of this step, which contains the FAS, was recovered by centrifugation at 30,000×g for 30 minutes at 4° C. and resuspended in purification buffer containing 2% (w/v) sucrose, 10 mM DTT and 0.01% (w/v) Lauryl Maltose Neopentyl Glycol (LMNG) in an orbital shaker at 18° C. The resuspended material was loaded on 10-45% (w/v) linear sucrose gradients in purification buffer containing 10 mM DTT, which were centrifuged at 100,000×g for 16 h at 4° C. Gradients were harvested in 1 ml fractions. SDS-PAGE was utilized to identify fractions containing FAS. Selected fractions were pooled and precipitated by the addition of 40% (v/v) PEG400. After centrifugation (30,000×g, 30 minutes), the supernatant was removed and the precipitate was resuspended in purification buffer containing 2% (w/v) sucrose, 10 mM DTT and 0.01% (w/v) LMNG. The resuspended material was loaded on linear 10-45% (w/v) sucrose gradients in purification buffer containing 10 mM DTT, and centrifuged at 79,000×g for 16 h at 4° C. Fractions containing FAS were identified by SDS-PAGE, pooled and cycled in the presence of 50 µM Malonyl CoA and 100 µM of NADPH for 30 min at 18° C. The protein was precipitated and concentrated by the addition of 40% (v/v) PEG400 and resuspended in purification buffer containing 2% (w/v) sucrose, 10 mM DTT and 0.01% (w/v) LMNG. Another round of linear 10-45% (w/v) sucrose gradients in purification buffer containing 10 mM DTT, centrifuged at 60,000×g for 16 h at 4° C. and subsequent re-precipitation of FAS fractions with 40% (v/v) PEG400 was required to yield a final purified protein preparation at ~15 mg/ml in purification buffer containing 10% sucrose (w/v), 10 mM DTT and 0.01% (w/v) LMNG. Protein concentrations were determined by Bradford assay (BioRad, Munich, Germany) using a BSA standard. This procedure reproducibly resulted in a yield of 15-20 mg purified yeast FAS.

Expression and Purification of the γ-Subunit

The γ-subunit was cloned as a synthetic gene into a pET151/D-TOPO® plasmid (Geneart, Regensburg) and expressed with an N-terminal $His_6$-TEV-tag in BL21 Star (DE3) competent cells. The transformed cells were grown at 37° C. with 180 rpm shaking until an $OD_{600}$ of 0.5 was reached, the temperature was then decreased to 18° C. and expression of the γ-subunit was induced 1 h after reduction of the temperature by the addition of 0.5 mM IPTG. γ-subunit was expressed for 16 h at 18° C. and 180 rpm. The cells were harvested by centrifugation (5000×g, 15 minutes, 4° C.), washed with cold $ddH_2O$ and stored at −80° C.

For purification, 7 grams of cells were resuspended in 42 ml of resuspension buffer (20 mM Tris-HCl pH 8.0, 500 mM NaCl, 10 mM imidazole, 0.2 mM PMSF, 10 mM benzamidine). After addition of 2 U/ml DNAse and 0.33 mg/ml lysozyme, the suspension was incubated for 30 min at 4° C. Cells were lysed by passing twice through an Avestin Emulsiflex C3 fluidizer (Avestin, Mannheim, Germany) at 15,000 PSI. The obtained lysate was centrifuged (30 min, 50,000 g, 4° C.) and filtered through Minisart NML Plus cellulose-acetate syringe filters with a 0.45 µm pore size (Sartorius). The cleared lysate was loaded onto a Ni-NTA gravity column (5 ml bed volume) pre-equilibrated with 20 column volumes (CV) of resuspension buffer. The column was washed with 20 CV resuspension buffer, followed by 20 CV of washing buffer (20 mM Tris-HCl pH 8.0, 500 mM NaCl, 20 mM imidazole, 0.2 mM PMSF, 10 mM benzamidine). For elution of the bound γ-subunit, 5 CV of elution buffer (20 mM Tris-HCl pH 8.0, 500 mM NaCl, 500 mM imidazole, 0.2 mM PMSF, 10 mM benzamidine) were applied and collected in 2 ml fractions. The elution fractions were analyzed with SDS-PAGE, the γ-subunit containing fractions pooled, and the protein concentration photometrically determined (MW=17.4 kDa, $\varepsilon_{280}$=5960). To cleave the N-terminal $His_6$-TEV-tag, TEV-protease was added to the protein in an enzyme-to-protein ratio of 1:50 followed by dialysis overnight in 5 l dialysis buffer (20 mM Tris-HCl pH 8.0, 5 mM ß-ME, 100 mM NaCl) at 4° C. The digested γ-subunit was applied to a Ni-NTA column, which was pre-equilibrated with 20 CV dialysis buffer. The flow-through was collected in 2 ml fractions and single fractions were analyzed by SDS-PAGE. Fractions containing pure γ-subunit were pooled and concentrated to a final concentration of 20 mg/ml using a 10 kDa MWCO Amicon Ultra 15 centrifugal concentrator (Millipore). The final protein was aliquoted, frozen in liquid nitrogen and stored at −80° C.

For further kinetic and structural investigations, purified γ-subunit was thawed and dialysed into the kinetic assay buffer at 4° C. using 6-8 kDa MWCO Dialyzer Mini D-Tubes (Millipore).

Steady-State Kinetics

Kinetic measurements were carried out with a V-750 UV-Visible spectrophotometer (Jasco Instruments) by monitoring NADPH consumption during substrate turnover. We analysed the substrate concentration dependence for all three FAS substrates: NADPH, Acetyl-CoA and Malonyl-CoA. Commercial acetyl-CoA and malonyl-CoA were further purified by Reverse-Phase (RP)-HPLC (ÄKTA BASIC 900, GE Healthcare Life Sciences) using a preparative column (MN Nucleodur® 100-5-C18, 250 mm×21 mm, 5 µm, flow rate: 10 ml/min). UV-absorption was detected at 215 nm, 260 nm and 280 nm, and purification was performed with a linear gradient of A (water+0.1% (v/v) TFA) to B (79.9% acetonitrile (v/v)+20% $ddH_2O$+0.1% (v/v) TFA). The peak fractions of the corresponding substrates were collected, lyophilized and stored at −80° C. until use.

We determined the substrate stock concentrations photometrically (NADPH: $\varepsilon_{340}$=6220 $M^{-1}cm^{-1}$, $\varepsilon_{371}$=2631.8±6.5 $M^{-1}cm^{-1}$; acetyl-CoA: $\varepsilon_{260}$=15.400 $M^{-1}cm^{-1}$; malonyl-CoA: $\varepsilon_{260}$=15400 $M^{-1} cm^{-1}$).

Initial velocities of fatty acid synthesis at varying acetyl- and malonyl-CoA concentrations were determined by the measurement of the time-dependent change in absorption of NADPH at λ=340 nm. To study the concentration dependence for acetyl-CoA, malonyl-CoA (120 µM), and NADPH (360 µM) were kept constant, while acetyl-CoA concentrations were varied between 0-180 µM. In the case of malonyl-CoA, acetyl-CoA (180 µM) and NADPH (360 µM) were kept constant, while the concentration of malonyl-CoA concentrations was varied from 0-180 µM. For the corresponding analysis of NADPH, we had to perform the measurements at a wavelength of λ=371 nm, because NADPH saturation could not be analysed at 340 nm owing to the high absorbance. All kinetic measurements were performed by incubating protein stock solutions containing 0.254 µM FAS either with or without 254 µM of the γ-subunit for 30 min at 30° C. Single enzymatic reactions contained 12.7 nM FAS with or without 12.7 µM γ-subunit, 0.2 mg/ml lysozyme as non-specific buffer protein, kinetic assay buffer, the respective required substrate concentrations and 10% (w/v) sucrose. Single reactions were pre-mixed and incubated (1 min, 30° C.). The enzymatic reaction was started by addition of malonyl-CoA and measured at 30° C. The obtained data were fitted with different kinetic models including the Michaelis-Menten equation, the Hill equation or with a modified Michaelis-Menten equation implementing substrate activation.

Crosslinking Mass Spectrometry

We analysed purified FAS holoenzyme by crosslinking mass spectrometry. The protein complex was incubated with 1 mM of BS3 crosslinker (from a 100 mM stock in DMSO) for 30 min at 30° C. The reaction was quenched with 100 mM Tris-HCl pH 8.0 (from a 1 M stock). Proteins were reduced and alkylated with 10 mM dithiothreitol and 40 mM iodoacetamide, respectively. In the presence of 1 M urea, proteins were digested by trypsin in an enzyme-to-protein ratio of 1:50 at 37° C. overnight. Peptides were acidified with trifluoroacetic acid (TFA) added to a final concentration of 0.5% (v/v), desalted on MicroSpin Columns (Harvard Apparatus) following the manufacturer's instructions, and vacuum dried. Peptides were resuspended in 50 µL of 50% acetonitrile/0.1% (v/v) TFA before enriching of cross-linked species by peptide size exclusion (SuperdexPeptide 3.2/300 column, GE Healthcare). Fractions of 50 µL were collected and those that eluted first and contain the cross-linked peptide pairs were analyzed by LC-MS/MS.

Cross-linked peptides of the first replicate were measured in technical duplicates on an Orbitrap Fusion Lumos Tribrid Mass Spectrometer coupled to a Dionex UltiMate 3000 UHPLC system (both Thermo Fisher Scientific) equipped with an in-house-packed $C_{18}$ column (ReproSil-Pur 120 C18-AQ, 1.9 μm pore size, 75 μm inner diameter, 30 cm length, Dr. Maisch GmbH). Samples were separated by applying the following gradient: mobile phase A consisted of 0.1% formic acid (v/v), mobile phase B of 80% acetonitrile/ 0.08% formic acid (v/v). The gradient started at 5% B, increasing to 12, 15 or 20% B within 3 min (according to fraction), followed by a continuous increase to 48% B within 45 min, then keeping B constant at 90% for 8 min. After each run the column was again equilibrated to 5% B for 2 min. The flow rate was set to 300 nL/min. MS1 survey scans were acquired in the orbitrap (OT) with a resolution of 120,000, an injection time (IT) of 60 ms and an automatic gain control (AGC) target of $5\times10^5$. Dynamic exclusion (DE) was set to 10 s and only charge states between 3 and 8 were considered for fragmentation. MS2 spectra were acquired in the OT of the 20 most abundant precursor ions, resolution 30,000, IT 120 ms and AGC target $5\times10^4$. Fragmentation was enforced by higher-energy collisional dissociation (HCD) at 30% normalized collision energy (NCE). The second replicate was treated with the following changes: we used a Q Exactive HF-X mass spectrometer (Thermo Fisher Scientific), at MS1 the IT was set to 50 ms and the AGC target to $1\times10^6$. At MS2, the IT was set to 128 ms and the AGC target to $1\times10^5$. DE covered 30 ms. Here, the 30 most abundant precursor ions were considered for fragmentation.

ProteomeDiscoverer 1.4 (Thermo Fisher Scientific) was used for converting .raw files into .mgf format (signal-to-noise ratio 1.5, 1000-10000 Da precursor mass). The generated .mgf files were subjected to pLink v. 1.23 (B. Yang et al., *Nat. Methods*. 9, 904-906 (2012)) to identify cross-linked peptides. Here, default settings were applied with carbamidomethylation of cysteines as a fixed and oxidation of methionines as a variable modification, the FDR was set to 0.01. Spectra of inter-cross-links between FAS and TMA17 within the first replicate were evaluated manually. For the second replicate, a score cut-off of 3 ($-\log_{10}$ transformation of the original pLink score) was applied and only cross-links supported by more than one cross-linked peptide spectrum match (CSMs) were considered.

The invention claimed is:

1. A recombinant polypeptide containing at least parts of the amino acids of SEQ ID NO: 1, comprising amino acid 1 to amino acid 112 of SEQ ID NO: 1, an insert located c-terminally to amino acid 112 of SEQ ID NO: 1, said insert is at least of 50 amino acids in length, optionally having C-terminally of said insert at least one amino acid from amino acid 113 to amino acid 150 of SEQ ID NO: 1.

2. The recombinant polypeptide according to claim 1 composed from the N-terminus to the C-terminus of
   a first unit comprising amino acid 1 to amino acid 112 of SEQ ID NO: 1;
   a second unit composed of amino acids 113 to 132 of SEQ ID NO: 1 containing an insert inserted after one of the amino acids 112 to 132 of SEQ ID NO: 1; and,
   optionally a third unit comprising amino acids 133 to 150 of SEQ ID NO: 1.

3. The recombinant polypeptide according to claim 1 consisting from the N-terminus to the C-terminus of the amino acid 1 to amino acid 112 of SEQ ID NO: 1, an insert of at least 50 amino acids, and the amino acid 133 to amino acid 150 of SEQ ID NO: 2.

4. The recombinant polypeptide of claim 1 wherein the insert is an enzyme.

5. The recombinant polypeptide of claim 1 wherein the size of the insert is at most 60 kDa.

6. A fatty acid synthase protein complex comprising the recombinant polypeptide according to claim 1.

7. A fatty acid synthase protein complex comprising the recombinant polypeptide according to claim 2.

8. The recombinant polypeptide of claim 1 wherein the insert is present after any one of the amino acid 112 of SEQ ID NO: 1 and before amino acid 132 of SEQ ID NO: 1, and wherein in the insert may substitute for the other amino acids of the moiety of amino acid 113 to 132.

9. The recombinant polypeptide of claim 4 wherein the enzyme is selected from a desaturase, thioesterase, oxygenase, hydroxylase, cyclogenase, and fatty acid lyase.

10. The recombinant polypeptide of claim 4, wherein the size of the insert is at most 40 kDa.

* * * * *

SEQUENCE LISTING

<160> NUMBER OF SEQ ID NOS: 4

<210> SEQ ID NO 1
<211> LENGTH: 150
<212> TYPE: PRT
<213> ORGANISM: Saccharomyces cerevisiae

<400> SEQUENCE: 1

```
Met Cys Ser Ala Gly Gly Ile Arg Arg Pro Ile Gln Ile Glu Glu Phe
1               5                   10                  15

Lys Thr Ala Ile Ser Gly Met Ser Asp Met Glu Leu Ala Gln Ile Lys
            20                  25                  30

Thr Glu Ile Glu Asn Ser Ile Asn His Leu Gln Arg Ser Asn Ala Arg
        35                  40                  45

Leu Gly Lys Tyr Ile Ala Lys Leu Glu Gly Ala Asp Asp Arg Leu Glu
    50                  55                  60

Ala Asp Asp Ser Asp Asp Leu Glu Asn Ile Asp Ser Gly Asp Leu Ala
65                  70                  75                  80

Leu Tyr Lys Asp Ser Val Arg Glu Asn Glu Ile Val Leu Asn Asn Tyr
                85                  90                  95

Asn Glu Arg Val Asp Ala Leu Glu Gln Glu Thr Val Tyr Arg Lys Thr
            100                 105                 110

Gly His Gly Lys Ser Lys His Glu Val Glu Ala Lys Asp Asn Thr Asn
        115                 120                 125

Lys Gly Pro Asp Val Asp Met Asp Asn Ser Asn Val Asp Val Val Thr
    130                 135                 140

Pro Asn Ser Ile Phe Ile
145                 150
```

<210> SEQ ID NO 2
<211> LENGTH: 18
<212> TYPE: PRT
<213> ORGANISM: artificial
<220> FEATURE:
<223> OTHER INFORMATION: peptide

<400> SEQUENCE: 2

```
Val Asp Met Asp Asn Ser Asn Val Asp Val Val Thr Pro Asn Ser Ile
```

```
                1               5              10              15
Phe Ile

<210> SEQ ID NO 3
<211> LENGTH: 9
<212> TYPE: PRT
<213> ORGANISM: artificial
<220> FEATURE:
<223> OTHER INFORMATION: peptide

<400> SEQUENCE: 3

Ser Ala Gly Gly Ile Arg Arg Pro Ile
1               5

<210> SEQ ID NO 4
<211> LENGTH: 17
<212> TYPE: PRT
<213> ORGANISM: artificial
<220> FEATURE:
<223> OTHER INFORMATION: peptide

<400> SEQUENCE: 4

Asp Asp Arg Leu Glu Ala Asp Asp Ser Asp Asp Leu Glu Asn Ile Asp
1               5                  10                  15

Ser
```